US011778505B1

(12) United States Patent
Marupaduga

(10) Patent No.: US 11,778,505 B1
(45) Date of Patent: Oct. 3, 2023

(54) PRIORITIZATION OF RELAY DATA PACKETS

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 337 days.

(21) Appl. No.: 17/087,762

(22) Filed: Nov. 3, 2020

(51) Int. Cl.
*H04W 28/02* (2009.01)
*H04B 7/155* (2006.01)
*H04W 28/08* (2023.01)

(52) U.S. Cl.
CPC ........ *H04W 28/0268* (2013.01); *H04B 7/155* (2013.01); *H04W 28/0278* (2013.01); *H04W 28/08* (2013.01)

(58) Field of Classification Search
CPC ....... H04W 28/0268; H04W 28/02878; H04W 28/08; H04W 36/22; H04W 40/04; H04W 48/06; H04B 7/155; H04B 7/204; H04B 7/18517; H04L 47/125
See application file for complete search history.

(56) References Cited

U.S. PATENT DOCUMENTS

| | | | |
|---|---|---|---|
| 2009/0103454 A1* | 4/2009 | Watanabe | H04L 47/70 370/254 |
| 2009/0196177 A1* | 8/2009 | Teyeb | H04L 47/30 370/231 |
| 2012/0236782 A1* | 9/2012 | Bucknell | H04W 72/1221 370/315 |
| 2013/0223222 A1* | 8/2013 | Kotecha | H04L 43/16 370/235 |
| 2019/0028400 A1* | 1/2019 | Kommula | G06F 9/544 |
| 2019/0342800 A1 | 11/2019 | Sirotkin et al. | |
| 2020/0145995 A1* | 5/2020 | Abdel Shahid | H04L 5/0094 |
| 2020/0196225 A1* | 6/2020 | Wang | H04W 76/11 |
| 2020/0267595 A1* | 8/2020 | Tesanovic | H04W 72/1242 |
| 2020/0336986 A1* | 10/2020 | Chen | H04L 1/0003 |

FOREIGN PATENT DOCUMENTS

WO WO-2021207505 A1 * 10/2021 ............ H04W 76/23

* cited by examiner

*Primary Examiner* — Ian N Moore
*Assistant Examiner* — Latresa A McCallum
(74) *Attorney, Agent, or Firm* — Jones Robb, PLLC

(57) ABSTRACT

Systems, methods and processing nodes are provided for prioritization of relay data packets. A processor determines one or more of a buffer status for the relay node and a load within the sector, compares the buffer status and/or the load to threshold values, and applies an updated QoS profile to the relay node when the comparisons satisfy particular criteria.

19 Claims, 8 Drawing Sheets

PRIORITIZATION OF RELAY DATA PACKETS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs. Deployment of the evolving RATs in a network provides numerous benefits.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach.

To ensure consistent coverage through a wide geographic range, existing technologies such as 4G can be used in combination with newer technologies such as 5GNR. In an E-UTRAN New Radio-Dual Connectivity EN-DC) configuration, wireless devices connect to an LIE eNodeB and 5G gNodeB. One node may act as a master node and the other as a secondary node. Thus, EN-DC allows devices to access both LTE and 5G simultaneously. Relay nodes can be or include a 5G-capable node, thereby being able to avail of the aforementioned dual connectivity or EN-DC for a more robust wireless backhaul. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Transitioning to these advanced technologies can be associated with problems. In particular, since relay nodes serve increasing numbers of end-user wireless devices, it must be ensured that the relay nodes themselves are provided with a high quality wireless backhaul, that is, the wireless connection between the relay node and the donor access node. Such considerations are further complicated when different types of relay nodes serve different types of end-user wireless devices. For example, various relay nodes have different capabilities, e.g. 5G relay nodes and 4G relay nodes, and may correspondingly serve end-user wireless devices that are also capable of either 5G or 4G. Appropriate allocation of wireless air interface resources to different relay nodes thus becomes essential for ensuring service quality for the end-user wireless devices attached to the relay nodes.

When excessive congestion or load exists in a network, 5G relays accommodating a large number of UEs may be negatively impacted. Wireless devices are likely to experience a decrease in performance due to backhaul congestion. Accordingly, a solution is needed for prioritizing data packets for high performance relays to minimize the negative impact of backhaul congestion.

OVERVIEW

Exemplary embodiments described herein include systems, methods, and processing nodes for dynamically altering a quality of service (QoS) profile. An exemplary method includes receiving a buffer status report from a relay node and determining if a relay node buffer is full based on the buffer status report. The exemplary method additionally includes applying an updated QoS profile to the relay node when the relay node buffer is full, thereby prioritizing relay node data packets.

In a further exemplary embodiment, a system includes a master node and at least one secondary node connected by a link and communicating with multiple wireless devices within a sector. The system additionally includes at least one relay node communicating with the master node and the secondary node and at least one processor configured to perform multiple steps. The steps include determining a load within the sector, comparing the load to a threshold load value and applying an updated QoS profile to the relay node when the load satisfies the threshold load value.

In an additional exemplary embodiment, a processing node is configured to perform multiple operations. The operations include determining a load on a sector, comparing the load to a threshold load value, and applying an updated QoS profile to a relay node within the sector when the load satisfies the threshold load value. By updating the QoS profile, relay packets can be prioritized.

In some embodiments, the load is measured by determining an end-to-end latency on a link between the master node and the at least one secondary node communicating with the relay node. In other embodiments, the load is assessed by determining a number of wireless devices connected to a master node and a secondary node within a cell. In other embodiments, the load is measured by evaluating a buffer status report. Alternatively, the load is measured by determining end-to-end latency or counting a number of connected devices when the buffer status report indicates that the buffer is full beyond a predetermined threshold. Other methods are within scope of the disclosure.

DETAILED DESCRIPTION

Figure 1:
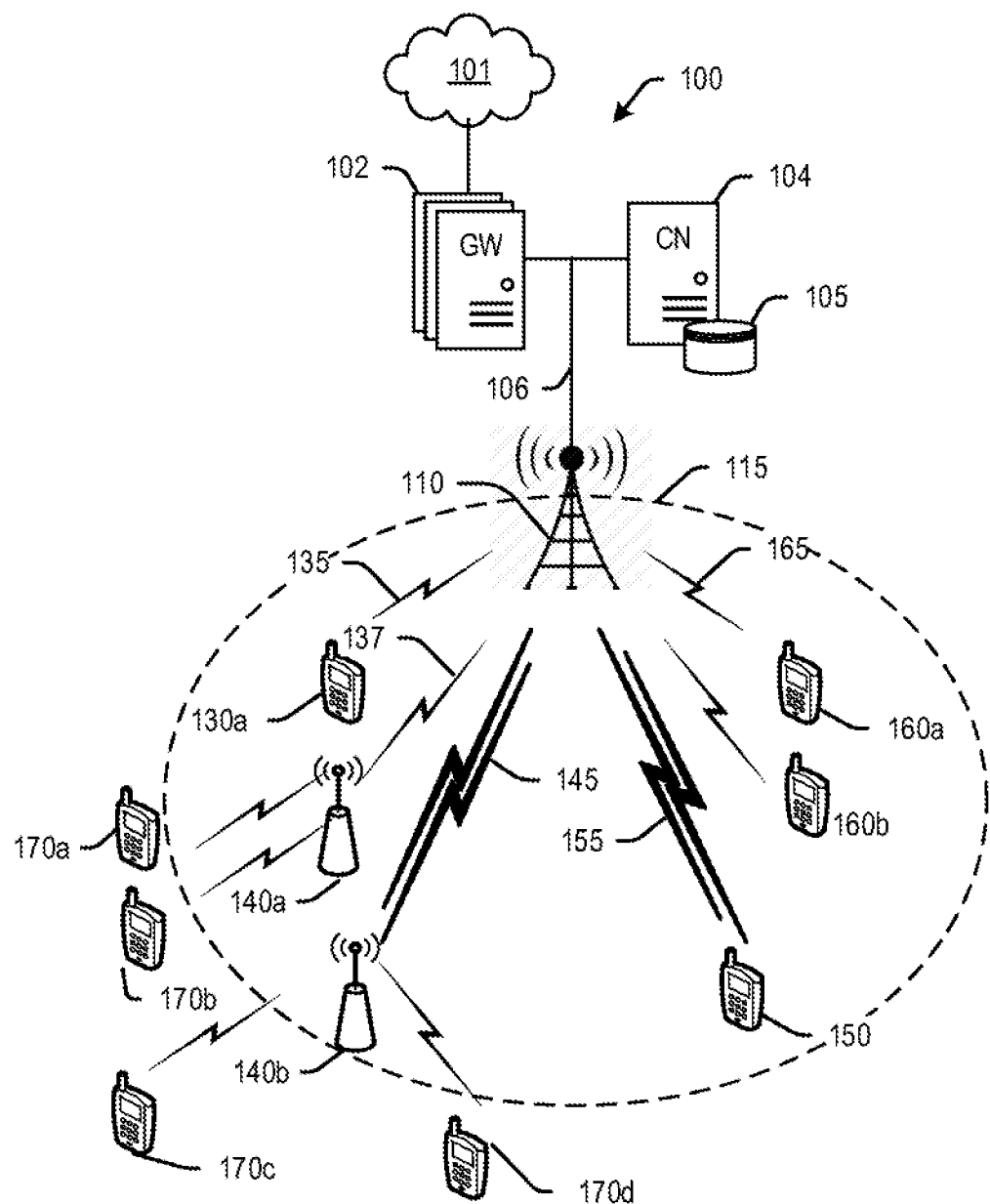
FIG. 1 depicts an exemplary system for wireless communication, in accordance with the disclosed embodiments.

Exemplary embodiments described herein include systems, methods, and processing nodes for dynamically adjusting a Quality of Service (QoS) profile in order to reprioritize relay node data packets, particularly 5G relay node data packets. In telecommunication networks QoS refers to traffic prioritization and resource reservation control mechanisms. QoS is especially important in networks, such as wireless communication networks, where the capacity is a limited resource. QoS profiles can be utilized to set traffic priorities across the network. Embodiments as set forth herein operate in networks utilizing a 5G NR technology. Embodiments further encompass networks utilizing an EN-DC architecture, which allows devices to access both LTE and 5G simultaneously. Other network configurations are within scope of the disclosure.

Embodiments as set forth herein prioritize data packets of a 5G UE relay over an X2 link. The 5G UE relay data packets are prioritized over other data packets when a high end-to-end latency exists over the X2 link and the 5G UE relay is handling a higher volume of data than other wireless devices or network components. In order to prioritize the data packets, the system may dynamically assign a higher QoS profile to the 5G relay.

In operation, the method may be implemented when the 5G Relay is connected to an EN-DC cell and a volume of data handled by 5G relay is higher than the volume of data handled by other 5G UEs connected to the cell. The method may make this determination based on buffer status reports forwarded by the UEs in the network. If the 5G relay buffer status report indicates that the 5G relay buffer is consistently full, then the 5G relay is handling a higher volume of data than UEs not having a full buffer status. If the 5G relay is handling a higher volume of data than other devices in the network, the 5Grelay may dynamically be assigned a higher QoS profile in the event there is a threshold high end-to end latency on an X2 link between nodes, such as between an eNodeB and a gNodeB.

By assigning a higher QoS profile, the method reprioritizes packet forwarding at the gNodeB. While packets with the same QoS are handled with a first in first out (FIFO) scheme, packets with higher QoS will be prioritized. Thus, a high number of front end 5G users can cause the 5G packets from a 5G relay to increase in priority. Accordingly, method steps may include identifying a 5G relay, determining if the 5G relay buffer is full or loaded beyond a predetermined threshold, and applying a higher QoS profile to the 5G relay and its data packets when the conditions are met.

Thus, 5G relay nodes may have their data packets prioritized in order to maintain high performance. The QoS profile may be maintained in a network node, such as an eNodeB or gNodeB or alternatively may be stored in a database accessible to network components. As network loading conditions change, it may be desirable to alter a QoS profile in order to prioritize data packets maintain a high quality of service, thereby improving overall resource utilization and network performance.

Embodiments as set forth herein further identify relay nodes within a sector and particularly identify 5G relay node. Additionally, embodiments described herein determine an end-to-end latency on an X2 link between a master node and secondary node communicating with the relay node. The end-to-end latency may be compared with a predetermined threshold and the updated QoS profile may be applied to the relay node when the end-to-end latency satisfies the threshold value. In embodiments set forth herein, the updated QoS profile is applied to the relay node only when the relay buffer is full, and the end-to-end latency satisfies the threshold value. Thus, in embodiments set forth herein, both conditions are satisfied as a precondition to prioritizing relay data packets.

As an additional or alternative step, embodiments described herein may determine a number of wireless devices connected to a master node and a secondary node within a cell. The method may compare the number of wireless devices to a threshold number prior to applying the updated QoS profile to the relay node when the number of wireless devices satisfies the threshold number.

Further, embodiments include a system having a master node and at least one secondary node connected by a link, such as an X2 link, and communicating with multiple wireless devices within a sector. The system also includes at least one relay node, such as a 5G relay node, communicating with the master node and the secondary node. A processor of the system determines a load within the sector and compares the load to a threshold load value. The processor may apply an updated QoS profile to the relay node when the load satisfies the threshold load value. In embodiments described herein, the relay node sends a buffer status report to the access node indicating a full status prior to application of the updated QoS profile. The load can be measured based on a number of devices or by assessing end-to-end latency on the X2 link. The updating of the QoS profile can prioritize data packets from the relay node in order to mitigate congestion and enhance overall network performance. Embodiments proposed herein dynamically reprioritize network traffic based on buffer status reports and other factors and dynamically adjust a QoS profile in order to re-prioritize network traffic.

Embodiments disclosed herein are particularly directed to dynamically adjusting a QoS profile for 5G EN-DC cells in which 5G relays are present. Because 5G relays are connecting to multiple wireless devices and both an eNodeB and a gNodeB, high end-to-end latency may exist on the X2 link between the eNodeB and gNodeB because of the greater number of connected UEs. While dynamic adjustment of the QoS profile aims to re-prioritize network traffic to improve wireless device performance, the process is directed to 5G relays in order to optimize network resources. Relay nodes, and particularly 5G relay nodes are an example of UEs requiring high performance. Accordingly, embodiments disclosed herein determine if a UE is capable of functioning as a 5G relay node before implementing the dynamic adjustment process. Accordingly, a solution as described herein alters data packet prioritization by updating a QoS profile for a 5G relay node requiring high performance, thereby enabling improved data flow to improve performance for one or more wireless devices.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device or UE, which may be a relay node, such as a 5G relay node. It is understood that the disclosed technology for may also be applied to communication between an end-user wireless device and other network resources. Further, multiple access nodes may be utilized. For example, some wireless devices may communicate with an LTE eNodeB and others may communicate with an NR gNodeB.

In addition to the systems and methods described herein, the operations for dynamically adjusting a QoS profile to adjust data packet prioritization may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130a, 150, 160a, and 160b and relay nodes 140a and 140b.

In this exemplary embodiment, access node 110 may be a macrocell access node configured to deploy at least two different carriers, each of which utilizes a different RAT. For example, a first carrier may be deployed by access node 110 in an LTE mode, and a second carrier may be deployed by access node 110 in an NR mode.

Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 150, 160a, and 160b and relay nodes 140a and 140b are illustrated as being in communication with access node 110 over various types of communication links. Each of the end-user wireless devices 130a, 150, 160a, and 160b and relay nodes 140a and 140b may be attached to the wireless air interface deployed by access node 110. Wireless links 135 and 165, as well as other wireless links that directly couple end-user wireless devices with access node 110, as shown in FIG. 1, form the wireless network (or wireless radio air interface) deployed by access node 110 within coverage area 115.

In disclosed embodiments, wireless device 130a and relay node 140a are illustrated as being in communication with access node 110 using a first RAT, which may provide, for example an NR communications links 135 and 137. The NR communication links 135 and 137 may comprise any communication channel that utilizes air-interface resources of an NR carrier deployed by access node 110. Wireless devices 160a and 160b may be in communication with the access node 110 over a second RAT, which may be for example, an LTE communications link 165 provided by any LTE carrier connected to the access node 110. Further, wireless device 150 and relay node 140b are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments an NR carrier is utilized as a primary carrier and at least on LTE carrier is utilized as a secondary carrier. Other configurations are within scope of the disclosure.

Access node 110 may be any network node configured to provide communication between end-user wireless devices 130a, 150, 160a, and 160b and relay nodes 140a and 140b and communication network 101, including standard access nodes such as a macro-cell access node, a base transceiver station, a radio base station, an eNodeB device, an enhanced eNodeB device, a next generation NodeB (or gNodeB) in 5G New Radio ("5G NR"), or the like. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. Alternatively, access node 110 may comprise a short range, low power, small-cell access node such as a microcell access node, a picocell access node, a femtocell access node, or a home eNodeB device. In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Relay nodes 140a and 140b may comprise any short range, low power, small-cell access nodes such as a microcell access node, a picocell access node, a femtocell access node, or a home eNodeB device. In addition, relay nodes 140a and 140b may comprise a small-cell access node paired with a relay wireless device configured to communicate over backhaul 137. Relay nodes 140a and 140b facilitate communication over the network with wireless devices 170a-170d.

Relay nodes 140a and 140b improve service quality by relaying communication between an access node, and end-user wireless devices in the wireless network. As illustrated, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto.

Wireless devices 130a, 150, 160a, 160b, and 170a-d may be any device, system, combination of devices, or other such communication platform capable of communicating wirelessly with access node 110 using one or more frequency bands and wireless carriers deployed therefrom. Each of wireless devices 130a, 150, 160a, 160b, and 170a-170d may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 150, 160a, and 160b. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. The controller node 104 may further operate as an element management system that controls access nodes in the network 101. In this instance, the element management system may be operable to measure and/or store various network parameters. One of ordinary skill in the art would recognize that controller node 104 is not limited to any specific technology architecture, such as Long Term Evolution (LTE) or 5G NR and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130a, 150, 160a, and 160b associations there between. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Further, a scheduling entity (within, for example access node 110 or controller node 104) may be configured to improve wireless device performance by allocating resources more efficiently. In embodiments disclosed herein, access node 110 may comprise logic for performing operations including locating wireless devices requiring high performance such as 5G relays, determining a buffer status, determining end-to-end latency on an X2 link, comparing the buffer status and end-to-end latency to threshold, and adjusting a QoS profile for the 5G relay when the thresholds are satisfied.

In an exemplary embodiment, controller node 104 includes a database 105 for storing information, such as various thresholds for number of devices, end-to-end latency, and buffer status as well as QoS profile information and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
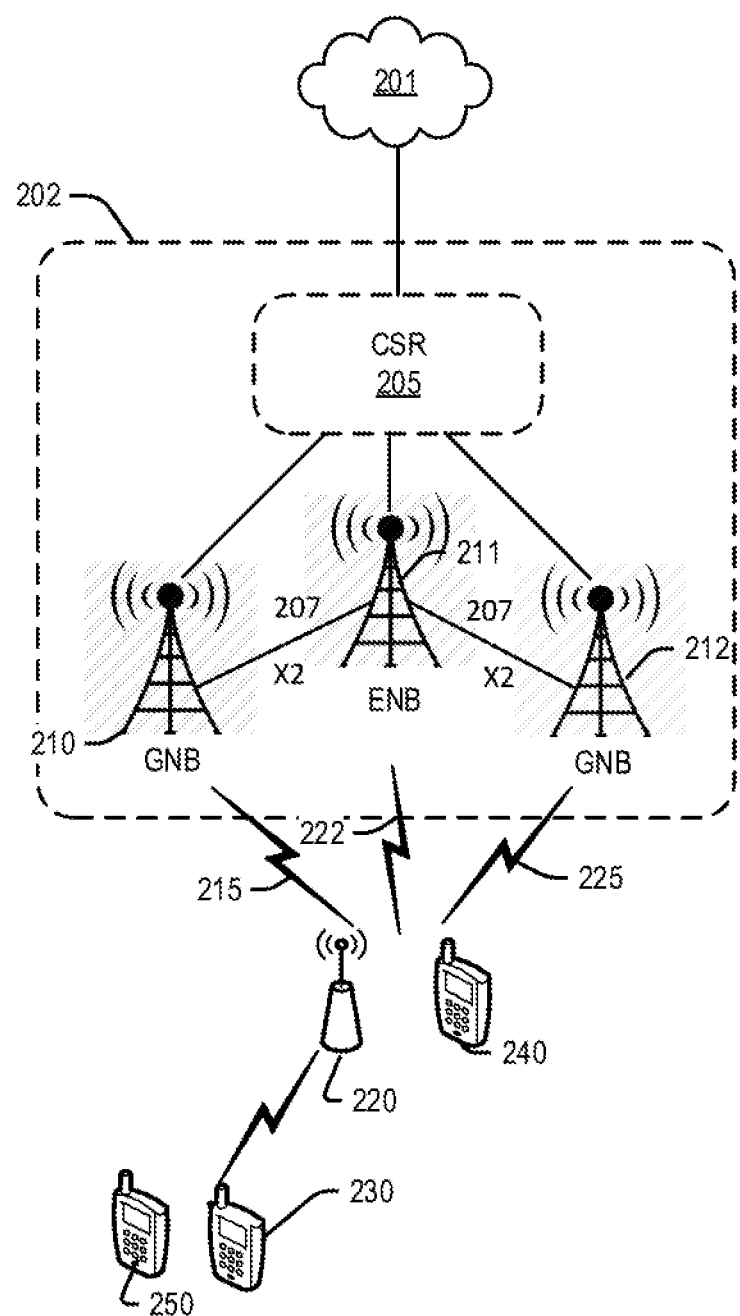
FIG. 2 illustrates an exemplary configuration of a communication system in an EN-DC radio access network.

FIG. 2 depicts an exemplary system 200 for E-UTRAN-NR Dual Connectivity (EN-DC) using 4G LTE and 5G NR. The access node 110 shown in FIG. 1 may utilize EN-DC using 4G LTE and 5G NR as shown. As shown in FIG. 1, the 4G LTE and 5G NR in a single node may be combined. System 200 includes a communication network 201, a radio access network 202, and wireless devices 230, 240, and 250. A relay node 220 may also be or include a wireless device. The wireless devices 230, 240, 250 may for example be high power UEs, low power UEs, or a combination thereof. Radio access network 202 further includes at least a cell site router 205, and access nodes 210, 211, and 212.

In embodiments as set forth herein, access node 110 shown in FIG. 1, may include all of nodes 210, 211, and 212 and may include additional nodes. Cell site router 205 can include any network node that is configured to route incoming data packets from network 201 to the illustrated wireless devices via access node(s) 210, 211, and 212 and to route outgoing data packets received from the illustrated wireless devices via access node(s) 210, 211, and 212 to the network 201. Therefore, network 201 can include any combination of networks, including a core network, intermediate/backhaul network, or packet data network (PDN). Persons having ordinary skill in the art may note that although only access nodes 210, 211, and 212, cell site router 205, and network 201 are illustrated in FIG. 2, other components such as gateways, controller nodes, user plane functions, etc. may be included as well.

In this exemplary embodiment, access node 210 includes a gNodeB, access node 211 includes an eNodeB, and access node 212 includes a gNodeB. In embodiments set forth herein, the access node 211 may be a master node and nodes 210 and 212 can operate as secondary nodes. In this one-to-many configuration, the eNodeB 211 is designated as the master node for wireless devices that can assign the wireless devices to the secondary nodes 210 and 212, which are illustrated as gNodeBs. For example, access node 211 deploys a first wireless air interface 222 using a first RAT, e.g., 4G LTE. Access node 210 can be configured to deploy a wireless interface 215 using a second RAT, e.g. 5G NR. Access node 212 deploys a wireless air interface 225, which can also utilize a 5G NR RAT. Each RAT can be configured to utilize a different frequency band or sub-band, a different channel size or bandwidth, and so on. For example, the 5G NR wireless interfaces 215 and 225 can be configured to utilize higher frequencies and larger channel bandwidths than the 4G LTE wireless interface 215. Further, the wireless devices can be configured to communicate using both RATs at the same time. For example, dual connections can be set up with one or more of the wireless devices 220, 230, 240, and 250 using both 4G and 5G air interfaces respectively, the 4G wireless interface 222 being used to transmit control information, and one of the 5G wireless interfaces (e.g. 5G interface 215) being used to transmit data information. For example, a processing node communicatively coupled to access node 211 can be configured to determine whether or not the wireless devices 230 and 240 are capable of communicating using both RATs (e.g. capable of 5G EN-DC) and further whether the wireless devices are relay nodes or other high performance nodes and instruct the access node 211 to broadcast an indicator in, for example, a system information message. Responsive to the indicator, the wireless devices 220 and 240 can attach to access node 211 which can use the 4G carrier to control and set up a dual connectivity session with the wireless devices 220, 240. Further, access node 211 can function as a master node and be configured to perform methods described herein.

Access nodes 210, 211, 212 can be coupled via a direct communication link 207, which can include an X2 communication link. Access nodes 210, 211, and 212 are capable of communicating control and data information across the X2 communication links. In an exemplary embodiment, access node 211 includes logic to determine how to allocate data packets between access node 211 and the secondary access nodes 210, 212, wherein the data packets flow between wireless devices 220 and 240 and a network node on network 201 via CSR 205. Such logic may include a packet data convergence protocol (PDCP) function. In operation, the amount of data transmitted over the X2 link increases based on a number of high performance UEs connected, particularly 5G UEs and specifically 5G relay nodes. The data from a 5G UE relay, such as relay node 220, may be directed to the gNodeB 210 and the gNodeB 210 may data mine which travels to the eNodeB. In embodiments set forth herein, logic is implemented to identify the 5G relay node 220, to determine if the 5G relay node buffer is full and to prioritize data packets to and from the 5G relay node 220 when the 5G relay node buffer is full. Optimally, the prioritization occurs when the cell is loaded, i.e., there are a threshold number of devices connected and/or a high end-to-end latency exists between the gNodeB and eNodeB.

Thus, RAN 202 can include a plurality of antenna elements (not shown herein) coupled to access nodes 210, 211, 212, with different antenna elements configured to deploy a different radio air interface using a different frequency. For example, each antenna element can be configured to deploy a 4G LTE air interface 222 or a 5G NR air interface 215, 225. Different quantities of antenna elements can be configured to deploy (or "assigned" to) a different type of air interface 215, 222, 225, depending on the needs of a network operator or users. Further, in split mode or "concurrent mode", individual antenna elements can be configured to simultaneously deploy at least two different air interfaces 215, 222, which enables wireless devices 220, 240 to transmit uplink data via two air interfaces selected from 215, 222, and 225 simultaneously. In an exemplary embodiment, the eNodeB portion 211 of RAN 202 is configured with logic to determine a transmission path for data packets traversing RAN 202. The transmission paths can traverse different RAT air interfaces 215, 22, 225, as well as different ports of CSR 205. The one-to-many configuration illustrated in FIG. 2 allows master node 211 to manage connections to multiple secondary nodes 210, 212.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to access nodes 110, 210, 211, 212, controller node 104, and/or network 101.

Figure 3:
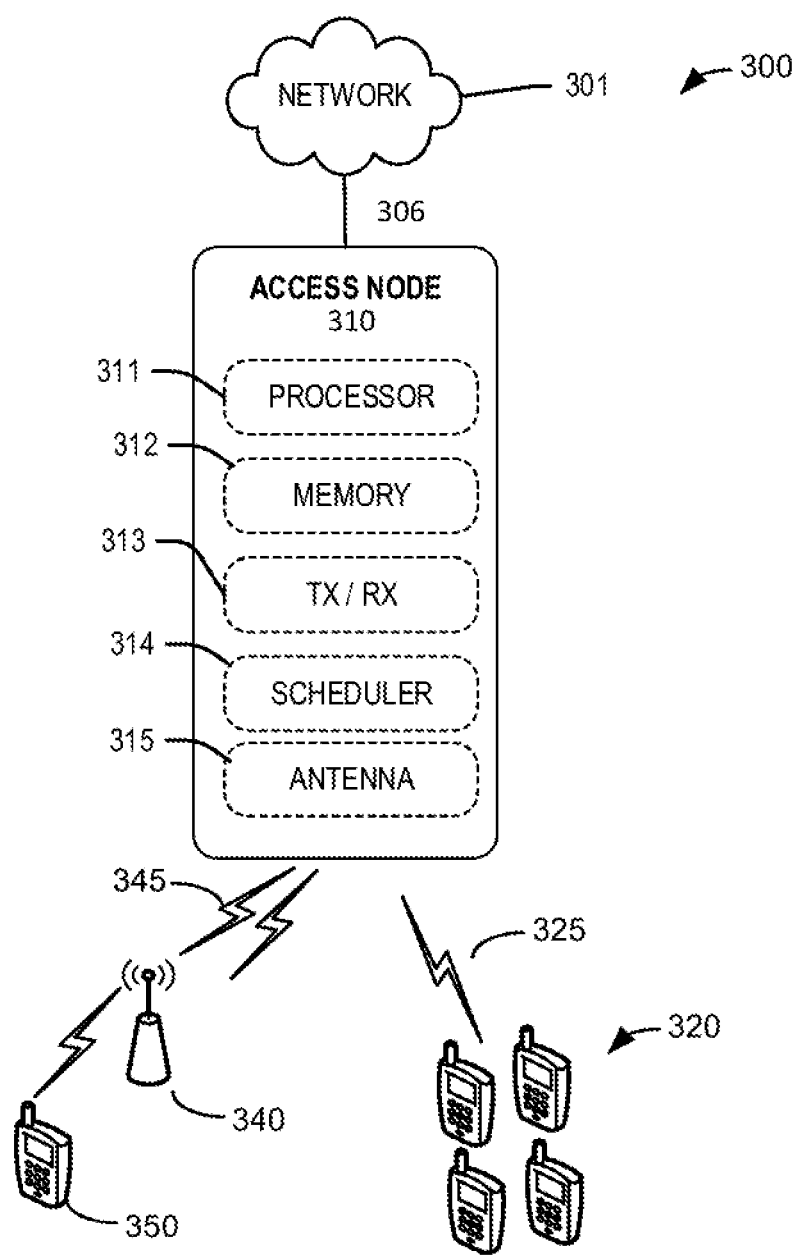
FIG. 3 is a diagram illustrating an access node in accordance with disclosed embodiments.

FIG. 3 illustrates an exemplary communication system 300 including an access node 310 configured to communicate with a relay node 340. Communication system 300 comprises network 301, access node 310, end-user wireless devices 320 and 350, and relay node 340. Access node 310 may comprise, for example, a macro-cell access node, such as access node 110 described with reference to FIG. 1. Access node 310 is illustrated as comprising a processor 311, memory 312, transceiver 313, scheduler 314, and antenna 315. Processor 311 executes instructions stored on memory 312, while transceiver 313 and antenna 315 enable wireless communication with wireless devices 320 and relay node 340. Instructions stored on memory 312 can include deploying a wireless air interface via combination of transceiver 313 and antenna 315, enabling wireless devices 320 and relay node 340 to access network services from network 301 via access node 310, and to communicate with end-user wireless device 350 via relay node 340. Thus, access node 310 may be referred to as a donor access node.

Access node 310 may further be configured to identify relay node 340 as being connected thereto, determine a configuration thereof, and schedule resources towards backhauls 325 and 335 based thereon. For example, the access node 310 may identify the relay node as a node 340 as a 5G relay node requiring high performance and cause a QoS profile to be updated in order to prioritize the 5G relay node data packets. Access node 310 may be configured to detect a loaded sector or high end-to-end latency on the X2 links shown in FIG. 2 and further to detect a full buffer status of the 5G relay node 340. Scheduler 314 may be provided for scheduling resources based on these determinations. These features may be enabled by access node 310 comprising two co-located cells, or antenna/transceiver combinations that are mounted on the same structure. Network 301 may be similar to network 101 discussed above. Carrier aggregation mode, during which a wireless device utilizes more than one carrier, enables the wireless devices to communicate with access node 310 using a combination of resources from multiple carriers.

Figure 4:
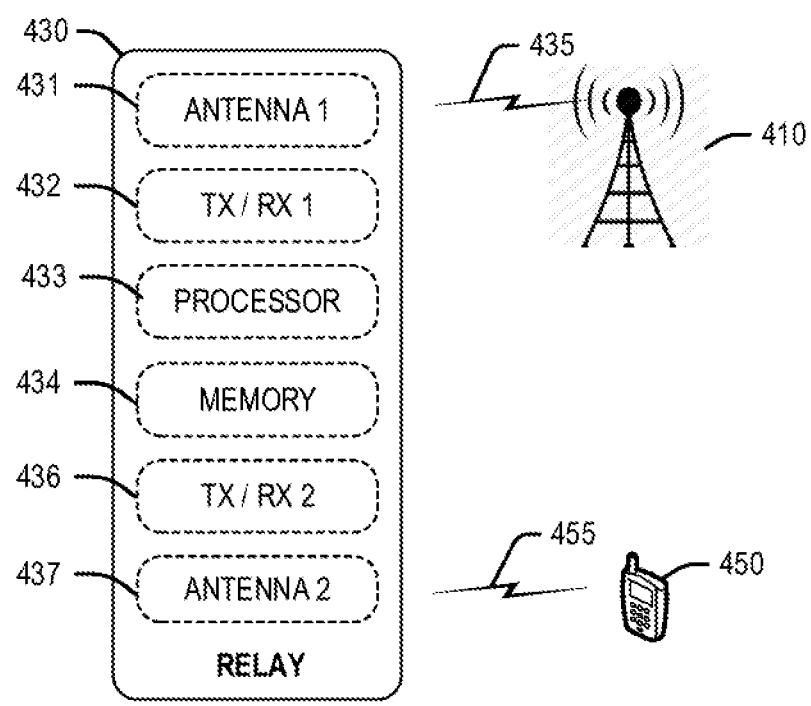
FIG. 4 is a diagram illustrating a relay node in accordance with the disclosed embodiments.

FIG. 4 illustrates an example relay node 430. In FIG. 4, relay node 430 comprises a first antenna 431, first transceiver 432, processor 433, memory 434, second transceiver 436, and a second antenna 437. Memory 434 may be used for storing instructions that are executed by processor 433. Transceiver 432 and antenna 431 may be used for direct (i.e. unrelayed) communication with donor access node 410 via wireless backhaul link 435. Relay node 430 includes transceiver 436 and antenna 437 for enabling communication with wireless device 450 via link 455 thereby enabling wireless device 450 to attach thereto. When relay node 440 is attached to access node 410, and wireless device 450 is attached to relay node 440, communication system 400 is formed.

Relay node 430 may be configured to identify itself as a relay node, or more specifically as a 5G relay node, to access node 410. Relay node 430 may be configured to receive instructions and resource allocations from access node 410. Relay node 440 may report or otherwise communicate to access node 410 buffer status reports, number of connected devices, such as 5G devices, or other useful parameters associated with the devices attached to relay node 430.

Further, instructions stored in memory 312 and/or memory 434 can include instructions for dynamically adjusting a QoS profile for the 5G relay node 430, which will be further explained below with reference to FIGS. 5-8. The instructions may facilitate prioritizing 5G relay node data packets by updating of a QoS profile for the 5G relay node.

Figure 5:
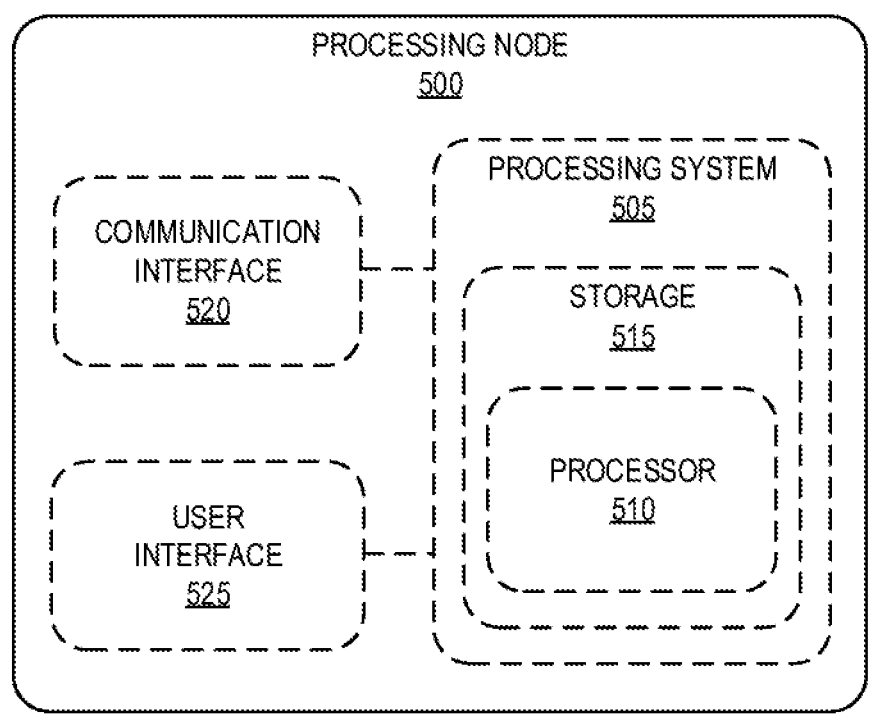
FIG. 5 depicts a processing node in accordance with disclosed embodiments.

FIG. 5 depicts an exemplary processing node 500, which may be configured to perform the methods and operations disclosed herein dynamically adjusting a QoS profile for a 5G relay node in order to prioritize 5G relay node data packets in a wireless network. In some embodiments, processing node 500 may be included in an access node, such as access node 110, 210, 211, 212, or 310 or in relay node 430. In further embodiments, processing node 500 may be included in controller node 104 and may be configured for controlling the access nodes.

Processing node 500 may be configured for dynamically adjusting a QoS profile of 5G relay nodes in the network as set forth above. The adjustment of the QoS profile may be performed dynamically in real time based on a threshold comparison in a network, such as the network 101. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

Figure 6:
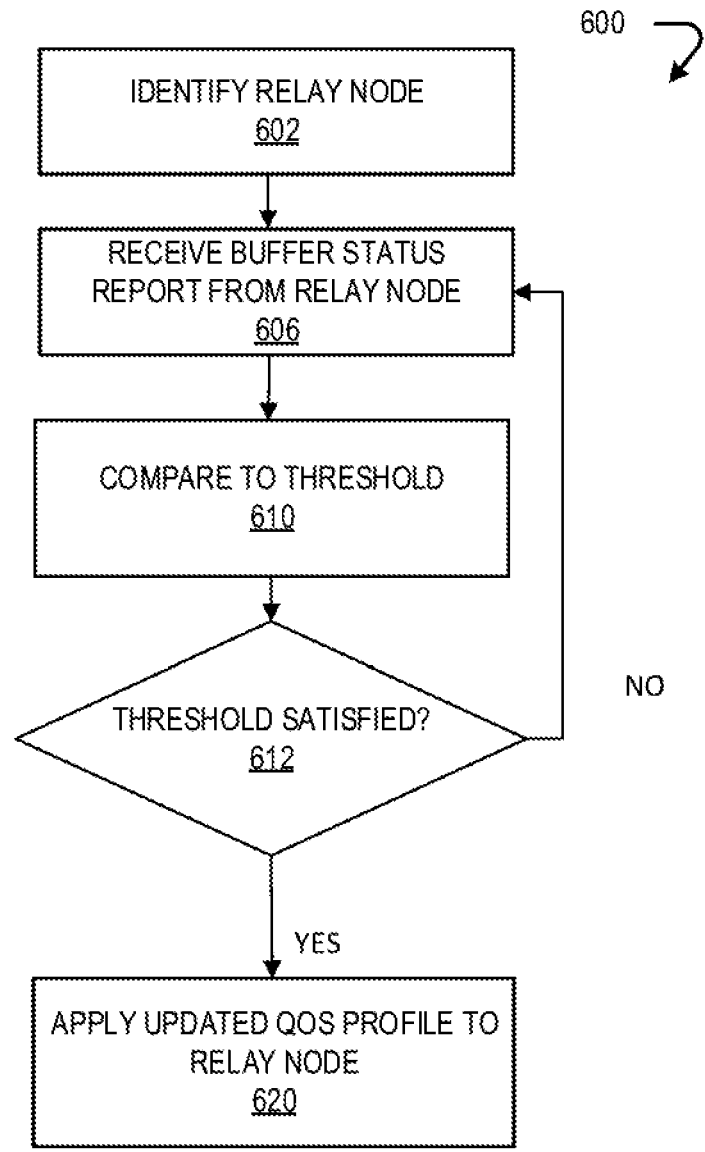
FIG. 6 depicts a method for dynamically prioritizing relay data packets in accordance with disclosed embodiments.

The disclosed methods for dynamically adjusting the QoS profile for the 5G relay node are discussed further below. FIG. 6 illustrates an exemplary method 600 for dynamically adjusting a QoS profile for a relay node, which may be a 5G relay node, in a network. Method 600 may be performed by any suitable processor discussed herein, for example, a processor included in access node 110, 210, 211, 212, 310, 410 or processor 510, included in processing node 500, or a processor included in controller node 104. For discussion purposes, as an example, method 600 is described as being performed by a processor included in access node 110.

Method 600 starts in step 602 and the access node 110 may identify a node as a relay node, or more specifically a 5G relay node in step 602. The identification may be based, for example, on a report sent by the relay node to the access node 110. Relays, in particular 5G relays, require high performance because they serve as a backhaul for small cells that are supporting a number of 5G wireless devices. The access node performs step 602 in order to avoid performing the remaining method steps for all wireless device in the network. Thus, due to limited resources consumed and noise created by processing, the remaining method steps may be limited specifically for 5G relay nodes. The access node 110 may identify the 5G relay nodes based on reports sent by the wireless devices, including the relay nodes to the access node, or based on information stored in a database available to the access node or using another known method.

In step 606, the access node 110 may receive a buffer status report from the 5G relay node. The buffer status report may be measured by the relay node and may be reported to the access node 110 at regular intervals, at predetermined times, or upon occurrence of a predetermined event. For example, a buffer status report may be forwarded from the relay node to the access node 110 whenever the relay node buffer is full. In some instances, buffer status reports may be reported by the relay node at regular intervals and may be stored in a database accessible to the access node 110.

In step 610, the access node 110 compares the buffer status report to a predetermined threshold. For example, the predetermined threshold may be set at 90%, and the buffer status of the relay node may be deemed full when the buffer status is over 90% filled. Alternatively, multiple buffer status reports over time may be evaluated against the threshold to illustrate that the relay buffer status was substantially full over a predetermined time period. In step 612, the access node 110 determines whether the threshold has been satisfied. If the relay node buffer satisfies the threshold so that it is viewed as substantially full, then the access node 110 updates a QoS profile for the relay node in step 620. The updating of the QoS profile may alter a QoS class indicator (QCI) of the relay node, such that a higher quality of service is required for the 5G relay node. Accordingly, data packets to and from the 5G relay node become prioritized data packets, differentiating them from other data packets that are evaluated on a FIFO basis.

If the buffer status report comparison of step 612 indicates that the threshold is not satisfied, i.e., the buffer is not full, the access node 110 does not alter the QoS profile for the relay node. Instead, the access node 110 continues to receive buffer status reports from the relay nodes in step 606 and processes all data packets on a FIFO basis.

The dynamic change in QoS profile enables dynamic prioritization of data packets to and from the 5G relay, thus improving performance for the wireless devices connected to the 5G relay as well as improving overall network performance. Data packets from other network components are separately evaluated.

Figure 7:
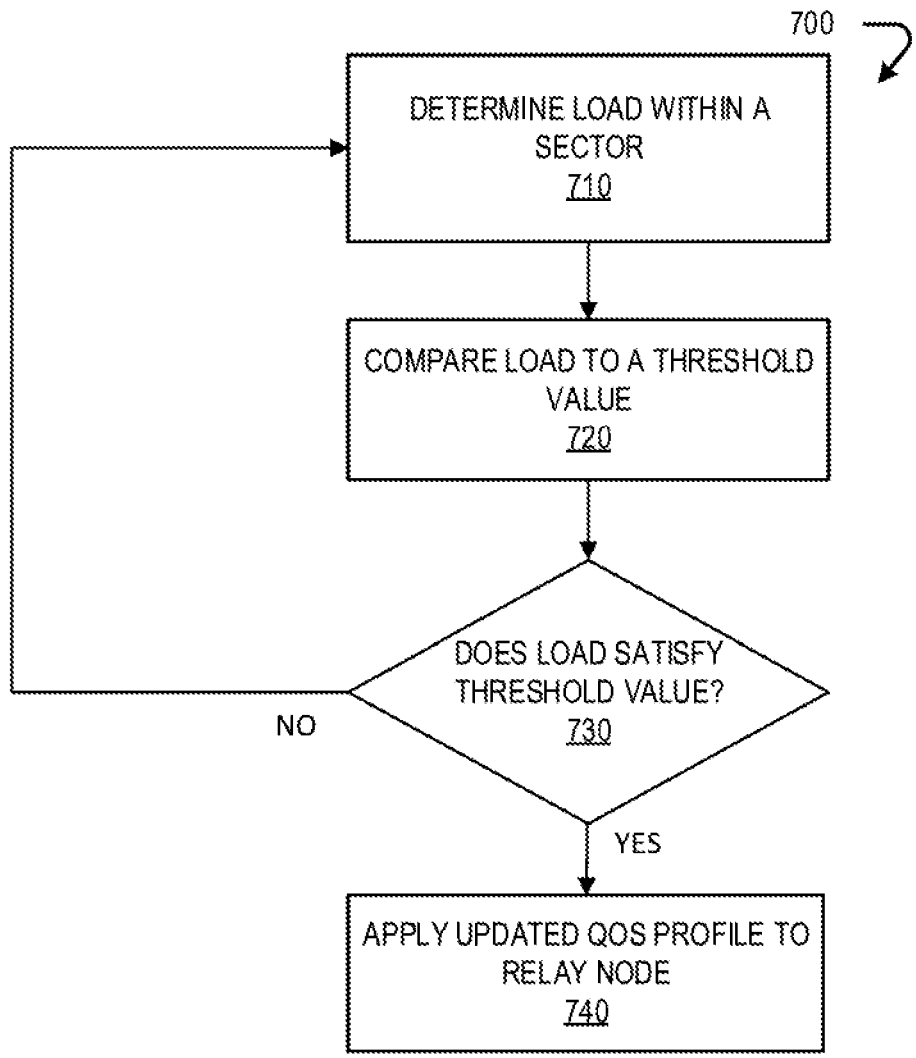
FIG. 7 depicts an additional exemplary method for dynamically prioritizing relay data packets in accordance with disclosed embodiments.

FIG. 7 depicts an exemplary method 700 for dynamically adjusting a QoS profile in accordance with embodiments set forth herein. Method 700 may be performed by any suitable processor discussed herein, for example, a processor included in access node 110, 210, 211, 212, 310, 410, processor 510 included in processing node 500, or a processor included in controller node 104. For discussion purposes, as an example, method 700 is described as being performed by a processor included in access node 110.

In step 710, the method determines a load within a sector. In some embodiments, the method may include determining a total load within a sector based on a number of wireless devices connected to one or more access nodes 110. In other embodiments, the method may include determining a number of devices utilizing a particular RAT in sector, such as, for example, a 5G RAT. In other embodiments, the determination of a load may be made through assessing an end-to-end latency on an X2 communication link between access nodes. For example, delays may be experienced through hair-pinning at the CSR 205 when a large volume of 5G data is being transmitted to the gNodeB. Thus, an end-to-end latency between the gNodeB and eNodeB may exceed a predetermined threshold value. In additional embodiments, the load may be related to buffer status of devices in the network and/or buffer status of network buffers. Information pertaining to load may be determined based on reports sent by wireless devices, relay nodes, and/or access nodes to a processor. The information may be conveyed periodically and may be stored in a database for later use. In embodiments set forth herein, multiple load measurement techniques may be used in combination.

In step 720, the access node 110 compares the load to a threshold value to determine if the load satisfies the threshold value. The threshold value may be or include a latency value, a number of wireless devices, a buffer status, or a combination of these parameters. If the load satisfies the threshold in step 730 based on the comparison of step 720, the access node applies an updated QoS profile to a relay node, for example a 5G relay node, in the sector in step 740. The relay node may be identified or may have previously been identified as explained above with respect to step 602.

If the load does not satisfy the threshold value in step 730, the access node may return to step 710 to evaluate the sector load by one or more of the above-identified methods. By altering the QoS profile of the identified network component, i.e., 5G relay node, the access node prioritizes packets passing through the 5G relay node in order to improve overall network performance.

Figure 8:
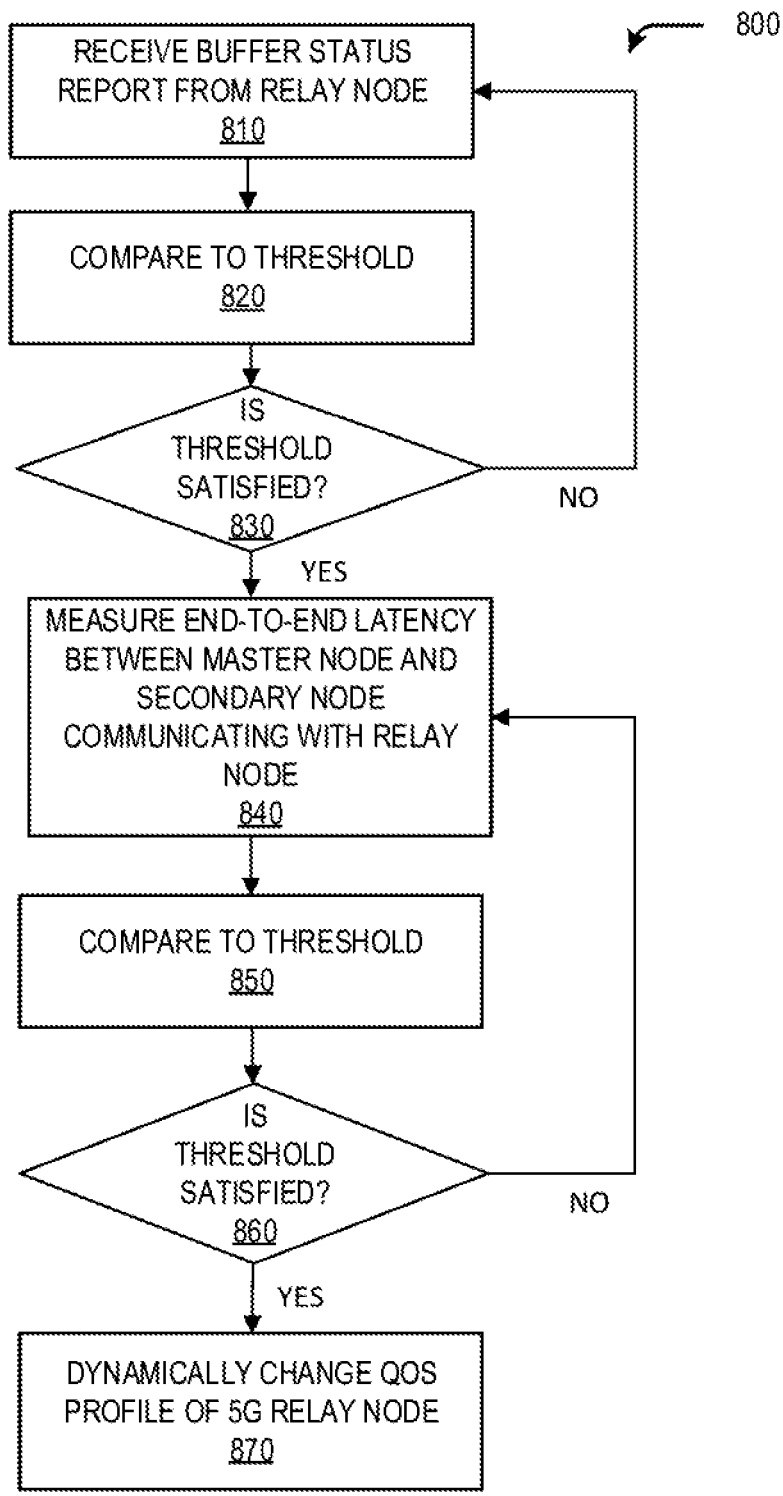
FIG. 8 depicts another exemplary method for dynamically prioritizing relay data packets in accordance with disclosed embodiments.

FIG. 8 illustrates a method 800 for dynamically adjusting a QoS profile of a network component to prioritize data packets passing through the network component. Method 800 may be performed by any suitable processor discussed herein, for example, a processor included in access node 110, 210, 211, 212, 310, 410, processor 510 included in processing node 500, or a processor included in controller node 104. For discussion purposes, as an example, method 800 is described as being performed by a processor included in access node 110.

In step 810, the access node 110 receives a buffer status report from a relay node. The relay node may be identified as a relay node, or more specifically a 5G relay node as set forth by step 602 of FIG. 6. The buffer status may be measured by the relay node and may be reported to the access node 110 at regular intervals, at predetermined times, or upon occurrence of a predetermined event. For example, a buffer status report may be forwarded from the relay node to the access node 110 whenever the relay node buffer is full. In some instances, buffer status reports may be reported by the relay node at regular intervals and may be stored in a database accessible to the access node 110.

In step 820, the access node 110 compares the buffer status report to a predetermined threshold. For example, the predetermined threshold may be set at 90%, and the buffer status of the relay node may be deemed full when the buffer status is over 90% filled. Alternatively, multiple buffer status reports over time may be evaluated against the threshold to illustrate that the relay buffer status was substantially full over a predetermined time period.

In step 830, the access node 110 determines whether the threshold has been satisfied. If the relay node buffer does not satisfy the threshold in step 830, the access node 110 returns to monitoring in step 810. If the relay node buffer satisfies the threshold so that it is viewed as substantially full, then the access node continues to step 840 to evaluate an end-to-end latency between the master node and secondary node over the X2 link.

In step 840, the access determines the end-to-end latency on the X2 link between access nodes. For example, delays may be experienced through hair-pinning at the CSR 205, (shown in FIG. 2), when a large volume of 5G data is being transmitted to the gNodeB. Thus, an end-to-end latency between the gNodeB and eNodeB may be unacceptably high.

Thus, in step 850, the access node 110 determines if the end-to-end latency exceeds a predetermined threshold value. The threshold value may have been previous selected based on network characteristics and may be stored in a database and retrieved for the purposes of comparison.

If the end-to-end latency does not exceed the threshold value in step 860, the access node returns to monitoring in step 840. However, if the end-to-end latency does exceed the threshold value in step 860, the access node 110 updates a QoS profile for the relay node in step 870. The updating of the QoS profile may alter a QoS class indicator (QCI) of the relay node, such that a higher quality of service is required for the 5G relay node. Accordingly, data packets passing through the 5G relay node become prioritized data packets, differentiating them from other data packets that are evaluated on a FIFO basis.

The dynamic increase in priority of the 5G relay data packets enhances overall network performance. As set forth above, the dynamic re-prioritization may be based both on buffer status of the relay and end-to-end latency. Alternatively one of these measurements or other additional measurements may be utilized in determining whether to re-prioritize the 5G relay data packets.

In some embodiments, methods 600, 700, and 800 may include additional steps or operations. Furthermore, the methods may include steps shown in each of the other methods. As one of ordinary skill in the art would understand, the methods 600, 700, and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
identifying, in a network utilizing a first radio access technology (RAT) and a second higher performance RAT, a relay node as utilizing the second higher performance RAT;
receiving a buffer status report from the relay node utilizing the second higher performance RAT;
determining if a relay node buffer for the relay node utilizing the second higher performance RAT is full based on the buffer status report; and
applying an updated quality of service (QoS) profile to the relay node when the relay node buffer is full, thereby improving QoS for the relay node utilizing the second higher performance RAT.

2. The method of claim 1, further comprising identifying at least one relay node within a sector.

3. The method of claim 1, wherein the relay node utilizing the second higher performance RAT is a 5G relay node.

4. The method of claim 1, further comprising determining an end-to-end latency on a link between a master node utilizing the first RAT and secondary node utilizing the second higher performance RAT communicating with the relay node.

5. The method of claim 4, further comprising comparing the end-to end latency with a threshold value and applying the updated QoS profile to the relay node when the end-to-end latency satisfies the threshold value.

6. The method of claim 1, further comprising determining a number of wireless devices connected to a master node and a secondary node within a cell.

7. The method of claim 6, further comprising comparing the number of wireless devices to a threshold number and applying the updated QoS profile to the relay node when the number of wireless devices satisfies the threshold number.

8. The method of claim 1, wherein the relay node is connected to a master node and a secondary node and the master node is an eNodeB and the secondary node is a gNodeB.

9. The method of claim 8, further comprising receiving the buffer status report at the master node.

10. A system comprising:
a master node communicating using a first radio access technology (RAT) and at least one secondary node utilizing a second higher performance RAT, the master node and the secondary node connected by a link and communicating with multiple wireless devices within a sector;
at least one relay node communicating with the master node and the secondary node; and
at least one processor configured to:
identify the relay node as utilizing the second higher performance RAT;
determine a load within the sector;
compare the load to a threshold load value; and
apply an updated QoS profile to the relay node utilizing the second higher performance RAT when the load satisfies the threshold load value in order to prioritize data packets from the relay node utilizing the second higher performance RAT over data packets from other relay nodes.

11. The system of claim 10, wherein the processor is further configured to determine an end-to-end latency on a link between the master node and the at least one secondary node communicating with the relay node.

12. The system of claim 11, wherein the processor is further configured to compare the end-to end latency with a threshold value and apply the updated QoS profile to the relay node when the end-to-end latency satisfies the threshold value.

13. The system of claim 10, wherein the master node receives a buffer status report from the relay node.

14. The system of claim 13, wherein the master node determines if the buffer status report of the relay node indicates that a buffer of the relay node is full.

15. The system of claim 14, wherein the processor applies the updated QoS profile to the relay node when the buffer of the relay node is full.

16. A processing node configured to perform operations comprising:
a processor executing instructions to perform operations including,
determining a load on a sector by determining an end-to-end latency on a link between a master node utilizing a first radio access technology (RAT) and secondary node using a second higher performance RAT communicating with a relay node utilizing the second higher performance RAT;
comparing the load to a threshold load value;
receiving a buffer status report from the relay node utilizing the second higher performance RAT;
comparing the buffer status to a predetermined threshold; and
applying an updated QoS profile to a relay node utilizing the second higher performance RAT within the sector when the load satisfies the threshold load value and the buffer status satisfies the predetermined threshold.

17. The processing node of claim 16, wherein the operations further comprise comparing the end-to end latency with a threshold value and applying the updated QoS profile to the relay node when the end-to-end latency satisfies the threshold value.

18. The processing node of claim 16, wherein determining the load on the sector comprises determining a number of wireless devices connected to a master node and a secondary node within a cell.

19. The processing node of claim 18, wherein the operations further comprise comparing the number of wireless devices to a threshold number and applying the updated QoS profile to the relay node when the number of wireless devices satisfies the threshold number.

* * * * *